(No Model.)

V. C. JARBOE.
HOISTING MACHINE.

No. 262,048. Patented Aug. 1, 1882.

WITNESSES:
Theo. G. Hoster
C. Sedgwick

INVENTOR:
V. C. Jarboe
BY
ATTORNEYS.

UNITED STATES PATENT OFFICE.

VERNON C. JARBOE, OF WYANDOTTE, KANSAS.

HOISTING-MACHINE.

SPECIFICATION forming part of Letters Patent No. 262,048, dated August 1, 1882.

Application filed December 28, 1881. (No model.)

*To all whom it may concern:*

Be it known that I, VERNON C. JARBOE, of Wyandotte, in the county of Wyandotte and State of Kansas, have invented a new and useful Improvement in Hoisting-Machines, of which the following is a full, clear, and exact description.

This invention relates to an improvement upon my new and improved hoisting apparatus for which my application for Letters Patent was allowed on the 3d of August, 1881, and it seeks to improve the construction in such manner that the machine will be more compact, cheaper of construction, and will employ but one sliding clutch.

Reference is to be had to the acccompanying drawings, forming part of this specification, in which similar letters of reference indicate corresponding parts in both the figures.

Figure 1:
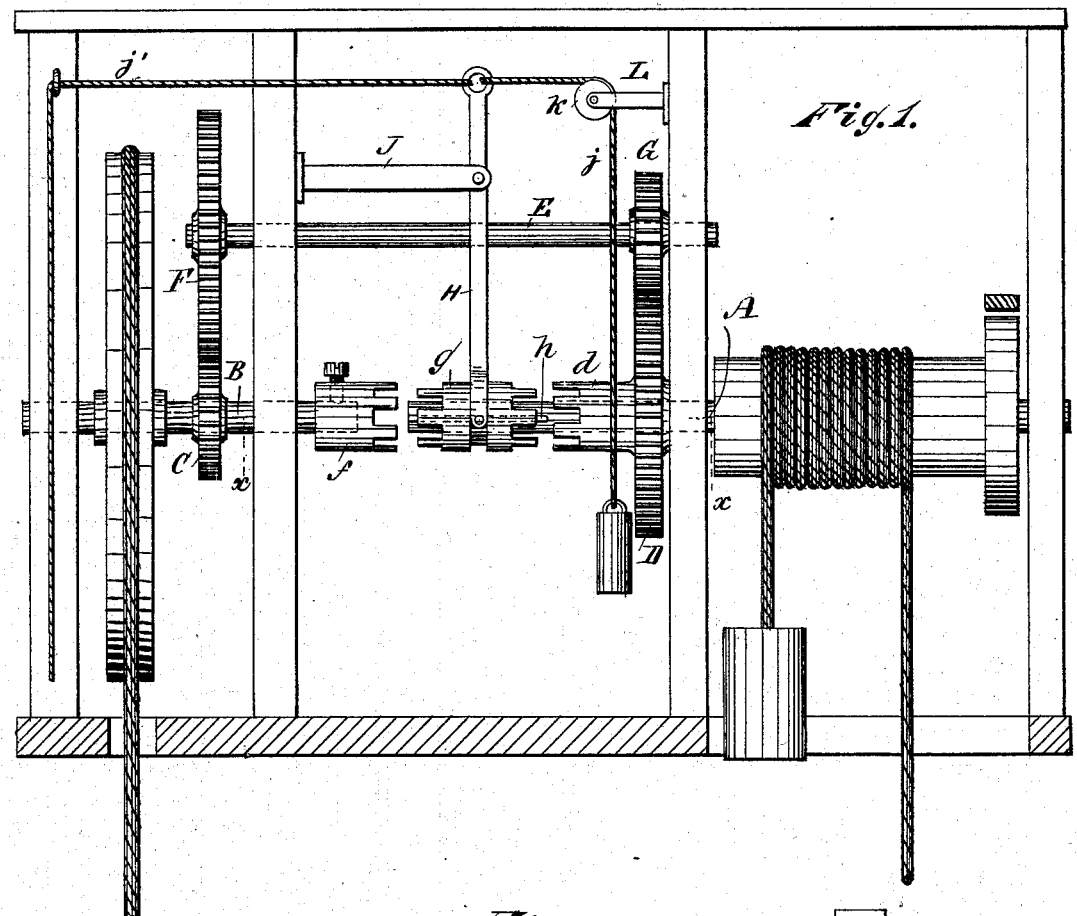
Figure 2:
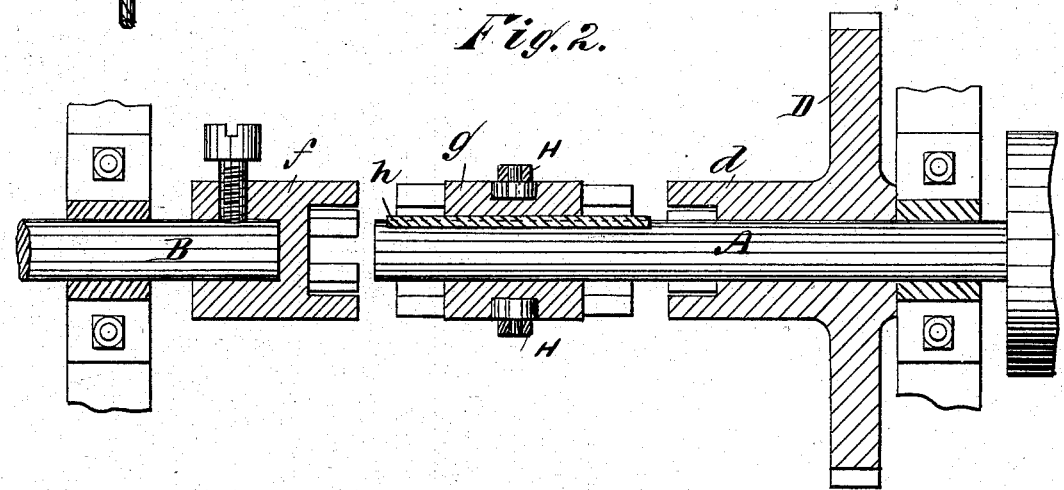

Figure 1 is a front elevation of my improved hoisting-machine. Fig. 2 is a sectional plan view taken on the line $x\ x$ of Fig. 1.

The shaft A, upon which the winding-drum is placed, and the shaft B, upon which the power-wheel is placed, are journaled in the frame in line with each other, the same as in my original invention.

Upon the shaft B is fixed the cog-wheel or pinion C, and upon the shaft A is placed the loose cog-wheel D, which is formed with the clutch $d$.

Journaled in the frame, above the shafts A and B, is the shaft E, which is provided with the fixed cog-wheels F and G, the former of which meshes with the cog-wheel or pinion C, while the latter meshes with the loose cog-wheel D, as clearly shown in Fig. 1.

Upon the end of the shaft B is placed the fixed clutch $f$, and upon the end of the shaft A is placed the sliding double clutch $g$, which is locked to the shaft by the feather $h$, formed upon the shaft. (Shown clearly in Fig. 2.) This double clutch is adapted to be moved upon the shaft A for engaging with the clutch $d$ or the clutch $f$ by means of the lever H, which is pivoted in the arm J, attached to the frame. This lever is held so as to cause the double clutch to engage the clutch $f$ (its normal position) by the weighted cord $j$, which passes over the pulley $k$, which is journaled in the arm L, secured to the frame.

With the sliding clutch engaging with the clutch $f$ it will be observed that the machine operates as a common wheel and axle, as the wheel D, with the sliding clutch in this position, is free to move loosely upon the shaft; but when the double clutch is moved by the cord $j$, which is attached to the lever H, as shown in Fig. 1, so as to engage with the clutch $d$, the wheel D will be locked to the shaft A, and this shaft will receive its motion from the shaft B through the cog mechanism, which is so arranged as to greatly increase the power of the machine, in the same manner and for the same purposes as fully described in my original application.

Having thus described my invention, I claim as new and desire to secure by Letters Patent—

1. The shaft B, having the clutch $f$, and the shaft A, having the loose cog-wheel formed with the clutch $d$, in combination with the double clutch $g$, substantially as and for the purposes set forth.

2. The shaft B, provided with the wheel C and clutch $f$, and the shaft A, provided with the loose wheel D and the double sliding clutch $g$, the wheel D being provided with the clutch $d$, in combination with the shaft E, wheels F and G, and means, substantially as described, for shifting the sliding clutch, as and for the purposes set forth.

VERNON COOK JARBOE.

Witnesses:
N. MCALPINE,
A. N. MOYER.